Jan. 8, 1946.  K. J. DE JUHASZ  2,392,581
ENGINE INDICATOR
Filed May 25, 1944   3 Sheets-Sheet 3
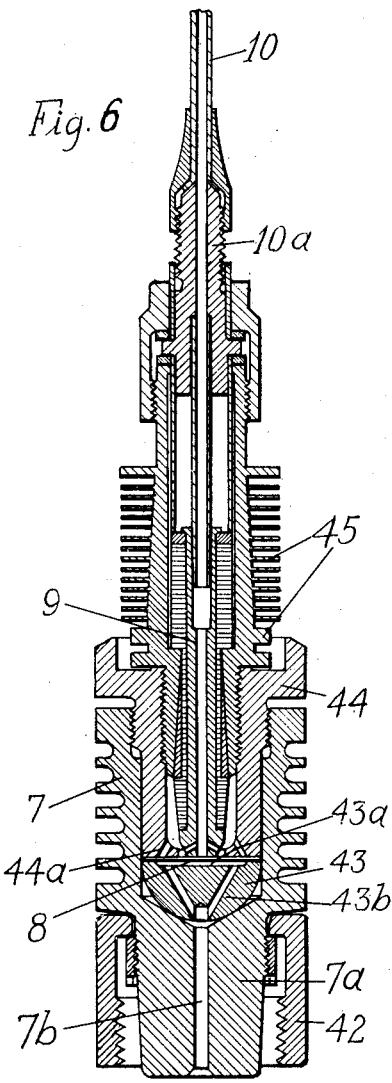
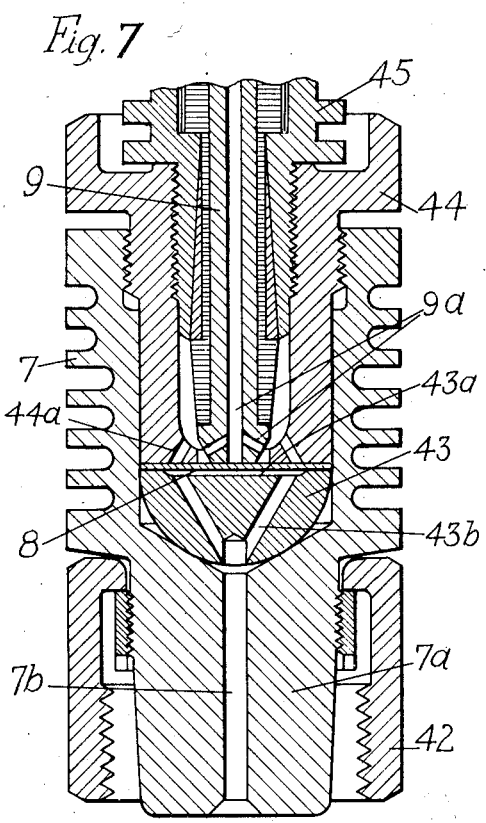
WITNESS
May 24, 1944
David F. Kapp
INVENTOR
Kalman John De Juhasz Patented Jan. 8, 1946

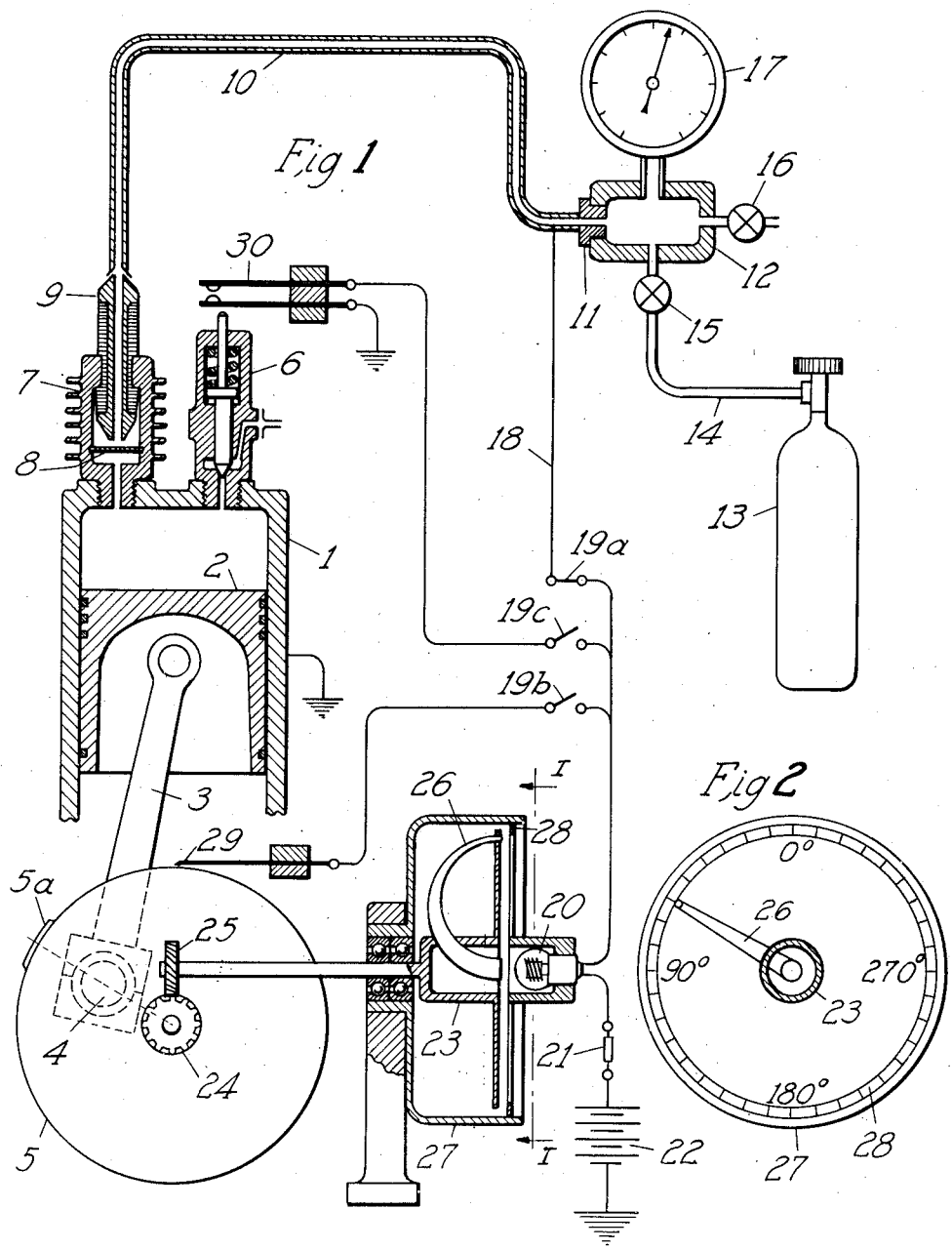

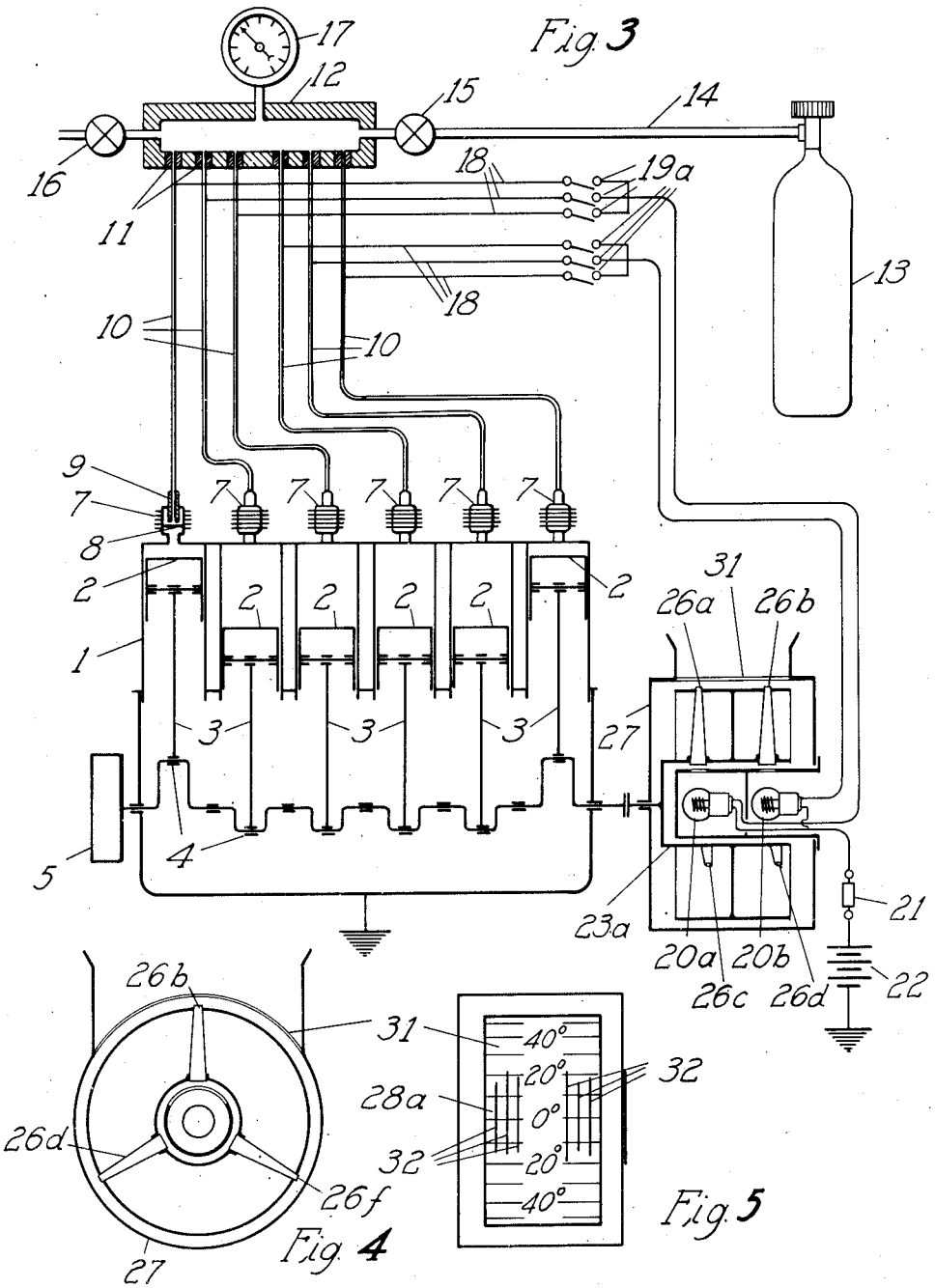

2,392,581

UNITED STATES PATENT OFFICE 2,392,581

ENGINE INDICATOR

Kalman John De Juhasz, State College, Pa.

Application May 25, 1944, Serial No. 537,345

5 Claims. (Cl. 73—115)

My invention relates to improvements in or modifications of instruments for examining the operation of reciprocating engines such as internal combustion engines, steam engines, pumps and compressors, in particulars by measuring the periodically fluctuating pressures therein, forming the subject of my prior United States Patent application Serial Number 392,254 filed May 7, 1941, Patent 2,382,547 granted Aug. 14, 1945.

My above cited prior United States application relates to a pressure indicator based on the pressure-balancing principle comprising a source of balancing pressure and means for altering and measuring the magnitude of said balancing pressure, and a pressure-responsive contactor acted upon by both the said periodically fluctuating pressure and said balancing pressure and means for making and breaking an electric contact in response to the difference between said fluctuating pressure and said balancing pressure to control a signal lamp connected in an electric circuit. The said signal lamp is carried by a rotor which is rotated in synchronism with the engine to be examined, and the lighted arc described by said signal lamp is measured on a graduated scale. By gradually altering the balancing pressure the said lighted arc varies in length. By observing the phase of beginning and of the end of the lighted arcs corresponding to the various values of the balancing pressure the complete cycle of the engine, and in particular the phase and magnitude of the maximum engine pressure can be determined.

Disadvantages of this device are: (1) that the signal lamp is subjected to centrifugal force and it is liable to derangement by the ensuing mechanical stresses; (2) that the signal lamp is located in a restricted space therefore its dimensions must be small and consequently its light power low; (3) that the inspection and removal of the signal lamp necessitates the stopping of the rotor; (4) that the electric current is supplied to the signal lamp by means of a sliding contact through a brush and ring device which is liable to derangement owing to oil or dirt getting between the contacting surfaces and spoiling the electrical conduction; (5) that the pressure-responsive contactor is of complicated construction, and the motion of its moving parts is impeded by friction and inertia, and therefore its response is subject to an uncertain and undesirably long lag.

The object of my present invention is to reduce these disadvantages and thus provide a rugged, trouble-free instrument which is easy to operate and to maintain in good condition. A further object is to adapt the instrument for the examination of multi-cylinder engines by comparing the pressure cycles in the individual cylinders both as regards the phase and the duration of a certain pressure value therein. A further object is to adapt the instrument for the examination of periodic events other than pressure events, such as the lift of the injection valve, or of the exhaust or intake valves.

The essential features of my present invention are that the signal lamp is held stationary at the center of the rotor and the light signal is brought to the periphery of the rotor by optical means, and that the pressure-responsive contactor is of the balanced diaphragm type of novel, improved construction.

My invention is illustrated by the attached drawings in which

Fig. 1 shows the instrument schematically, partly in longitudinal section, as applied to a one-cylinder engine, comprising a pressure-responsive contactor, dead center contactor and injector-actuated contactor, balancing pressure means, signal lamp circuit, and rotating optical system;

Fig. 2 shows the frontal view of the rotor as it appears to the observer, partly in section through plane I—I;

Fig. 3 shows schematically another embodiment of the instrument, as adapted to a six-cylinder engine, showing the rotor and its housing, and the holder for the signal lamp in longitudinal section;

Fig. 4 is a cross-sectional view of the rotor and its housing shown in Fig. 3;

Fig. 5 is the view of the rotor housing shown in Figs. 3 and 4 viewed from above, showing the scale on which the lengths of the lighted arcs are measured, as it appears to the observer;

Fig. 6 is the longitudinal section of a preferred construction of the pressure-responsive contactor;

Fig. 7 is a magnified portion of Fig. 6 showing some of the essential parts in clearer detail.

Referring to Fig. 1 one embodiment of my invention is shown schematically, as applied to a one-cylinder Diesel engine which is assumed to be of the two-cycle type, and which comprises the cylinder 1, piston 2, connecting rod 3, crankpin 4, flywheel 5, and injector valve 6. To the cylinder 1 is attached the pressure-responsive contactor comprising parts 7, 8 and 9. The part 7 is a body, preferably formed with cooling fins, the inside of which forms a chamber which is divided by the flexible metal diaphragm 8 into two parts; the lower part of the chamber communicates with the cylinder space of the engine, and the upper part with the space of balancing pressure. Thus the diaphragm 8 is acted upon on its under side by the periodically fluctuating engine pressure, and on its upper side by the balancing pressure, and is deflected by the difference of these two pressures away from that side at which the pressure is higher. The upper part of the chamber contains the insulated electrode 9 which is drilled through and at its upper tip is connected, by means of the insulated metal tubing 10 and insulated connection 11, to the chamber 12 containing the pressure-balancing medium. Whenever during the operation of the engine the fluctuating pressure in the cylinder 1 exceeds the balancing pressure the diaphragm 8 deflects towards the insulated electrode 9 and makes contact with it. As pressure-balancing medium some inner gas, such as carbon dioxide, nitrogen or air can be used which is stored in the container 13 at high pressure, and is admitted to chamber 12 by means of tubing 14 and fill valve 15. The chamber 12 is fitted also with release valve 16 and pressure gauge 17. By manipulating the fill valve 15 and release valve 16 the balancing pressure in chamber 12 can be altered at will, and its actual value read on the pressure gauge 17.

The body 7 and also the metal diaphragm 8 are grounded through their metallic connection to the engine. The insulated electrode 9 and the insulator-covered tubing 10 form parts of an electric circuit, further elements of which are the wire 18, switch 19a, signal lamp 20, fuse 21, and battery 22, the other terminal of which is grounded. The signal lamp 20 is preferably of the rapid response, glow discharge type, such as a neon lamp. It will be readily seen that, assuming switch 19a closed, the circuit is controlled by the pressure-responsive contactor: the signal lamp is lit whenever the diaphragm 8 makes contact with the insulated electrode 9, that is, whenever during the engine cycle the fluctuating pressure in the engine is greater than the balancing pressure, and the signal lamp is unlit whenever the fluctuating pressure in the engine is lower than the balancing pressure. The rotor 23 is driven in synchronism with the engine by means of some positive drive, such as the helical gearing 24 and 25 shown in Fig. 1, and it carries the light-conducting arm 26 which extends from near the center of rotation of the rotor 23 to its periphery. The light-conducting arm 26 is a suitably curved polished rod of glass, quartz, or transparent plastic such as the Lucite material made by the Du Pont Company, having the property that light entering at one end is transmitted with very little loss to, and emitted from its other end. Whenever the rotor 23 rotates the peripheral end of the light-conducting arm 26 describes a circle the plane of which is perpendicular to the axis of rotation of the rotor.

The rotor 23 is supported in the stationary housing 27 which holds the signal lamp 20 in a stationary, that is, non-rotating position near to the center of rotation of the rotor 23, so that the signal lamp illuminates the central end of the light-conducting arm 26. The housing 27 carries also the graduated scale 28, shown more clearly in Fig. 2.

Whenever the rotor 23 is rotated by the engine, and the signal lamp 20 illuminates the central end of the light-conducting arm during part of the revolution, the peripheral end of the light-conducting arm will describe a lighted arc, the length, and the phase of beginning and the phase of end of which lighted arc can be read on the graduated scale 28. It is understood that in the initial setting the engine is brought into the dead center phase and the peripheral end of the light-conducting arm should then point to the zero mark on the scale 28.

In order to visualize the operation of this device assume that the balancing pressure is adjusted to a low value at or near atmospheric pressure. Then the diaphragm 8 of the pressure-responsive contactor will lie against, and make contact with the lower end of the insulated electrode 9 during most of the compression and expansion stroke of the engine cycle, and the lighted arc described by the peripheral end of the light-conducting arm 26 will extend around a large portion of the periphery. If then, by admitting pressure gas to the chamber 12 the balancing pressure is increased the lighted arc will diminish in length. By increasing further the balancing pressure the lighted arc will become only a few degrees in length, and finally only an occasional flicker will occur near the top dead center phase when the balancing pressure attains the value of the maximum pressure of the engine cycle. Thus the complete diagram of the cylinder pressure can be obtained by taking a set of data by noting the balancing pressure and the corresponding phases of the beginning and end of the lighted arc, increasing the balancing pressure in steps, and then plotting the pressure as a function of phase of rotation.

The described signal lamp and phase-indicating device can be controlled by some other periodic event of the engine instead of the pressure cycle, by incorporating in the electric circuit a contactor responsive to the periodic event to be investigated. Such periodic events, which are of interest for supervising the operation of the engine are, for example, the occurrence of dead center, the opening and closing of the intake, exhaust, and injector valves.

In Fig. 1 is illustrated a dead center contactor 29 which is not in contact with the flywheel itself but makes contact with a raised cam surface 5a formed on the flywheel 5, symmetrically situated relative to the crank 4. This contactor can be switched into the electric circuit of the signal lamp by means of switch 19b. It will be realized that when the signal lamp is controlled by this contactor 29 the midpoint of the lighted arc described by the peripheral end of the light-conducting arm 26 will define the dead center phase. Then, by alternately switching into the electric circuit either the pressure-responsive contactor 7, 8, 9 or the dead center-responsive contactor 29 the phase disposition of the pressure indication with reference to the dead center phase can be determined. This method of dead center determination eliminates the error, slight though it is, due to the delay of response of the signal lamp, and hence it is more accurate than relying on the initial setting of the light-conducting arm as described above.

In Fig. 1 there is illustrated also another contactor 30 controlled by the injector valve 6, which contactor can be switched into the signal lamp circuit by means of the switch 19c. It will be realized that when the signal lamp is controlled by this contactor 30 then the lighted arc described by the peripheral end of the light-conducting arm 26 will define the duration and phase, in terms of crank angle, while the injector valve is open.

It is only a matter of skill to devise other types of contactor adapted to be actuated by any other periodic event of the engine which may be of interest for some particular investigation.

The particular advantage of the described instrument resides in its adaptability for determining the duration and relative phase of a number of periodic events in rapid succession. For example, in a multi-cylinder engine the pressure cycles of the various cylinders may show an uneven loading or otherwise unsatisfactory operation. Then by switching into the circuit the contactors actuated by the injector valves it can be determined whether or not the fault is caused by uneven timing of the injections.

The several contactors responsive to several periodic events can be switched in the circuit even simultaneously, provided the durations of the periodic events do not overlap. Thus, the peak portions of the pressure cycles of a multi-cylinder engine can be examined simultaneously, provided the duration of the pressure is short enough for the several lighted arcs not to merge together. For the examination of the operation of multi-cylinder engines it is usually sufficient to observe the duration and phase of the peak portion of the engine cycle, and this can be accomplished by means of the rotor and signal lamp instrument shown in Figs. 1 and 2, in combination with several pressure-responsive contactors mounted on the several cylinders and connected into the electric circuit by switches such as the 19a, 19b and 19c shown. The only drawback is that the lighted arcs will appear at various positions around the scale 28 of the rotor housing, and therefore the comparison of their lengths and phases requires a certain amount of attention.

This drawback is eliminated by a construction of the rotor and signal lamp unit as shown in Figs. 3, 4, and 5 as applied to a six-cylinder engine, with cranks disposed at 0, 120 and 240 degrees, as usual. In this embodiment two signal lamps 20a and 20b are used, each serving three cylinders, and the rotor 23a has six light-conducting arms 26a–f, each of which serves one cylinder. The peripheral ends of the light-conducting arms 26a–f rotate in different planes perpendicular to the axis of rotation of rotor 23a and the angular and axial disposition of the peripheral ends of the light-conducting arms 26a–f is the same as that of the cranks of the engine. In this embodiment the scale 28a is drawn on a transparent cylindrical screen 31 which is coaxial with the axis of rotation of the rotor 23a. In virtue of the above described disposition of the light-conducting arms 26a–f their peripheral ends pass the zero line of the scale 28a always at the instants at which the corresponding cranks of the engine pass their dead center positions. In operation there will appear on the screen 31 six lighted arcs 32, parallel with each other, and their lengths and phase dispositions can be observed and directly compared by scale 28a on the screen 31. Owing to the fact that in this described embodiment one signal lamp serves three cylinders, and the three light-conducting arms served by one signal lamp are disposed at 120 degrees relative to one another, therefore this arrangement is adapted for the examination of such engine phenomena of which the duration is less than 120 degrees crank rotation, otherwise the lighted arcs would overlap and merge into one another. For investigations in which this limitation is objectionable, such rotor and signal lamp arrangements can be used in which one signal lamp serves only two, or even one light-conducting arm. It will be realized that the described instrument can be adapted by those skilled in the art to engines of various types, be it of the in-line, V, or radial type, by using suitable combinations of signal lamp, light-conducting arms and contactors.

Pressure-responsive contactors of the general type as described and illustrated in parts 7, 8 and 9 are already known to the art but the functioning of their hitherto used executions is in some respects defective. In operation these contactors are exposed to high temperature and pressure, and to rapid and frequent stress reversal. As a consequence the diaphragm 8 is liable to buckling or permanent deformation, and hence to faulty pressure indication and rapid failure.

The construction according to my invention shown in longitudinal section in Figs. 6 and 7 greatly mitigates these defects. The essential features of this construction are: (1) directing the heat flow away from the diaphragm as far as possible, (2) clamping the diaphragm between two flat lapped surfaces with uniform pressure.

Referring to Figs. 6 and 7 the pressure-responsive contactor comprises the body 7 which is provided with cooling fins, and it is adapted to be attached to the engine by means of the tapered spigot 7a and nut 42 or by other suitable manner. The inside of the body 7 forms a chamber having a conical bottom which communicates with the engine space by means of the drilled passageway 7b. The metal diaphragm 8 is clamped between the two clamping members 43 and 44. The lower clamping member 43 is of approximately hemispherical shape and it is seated with its spherical surface on the conical bottom of the chamber, and its upper surface is adjacent to the diaphragm 8. This upper surface is formed with a peripheral annular clamping area in close contact with the peripheral portion of diaphragm 8, and within it with a shallow recess 43a allowing the diaphragm 8 a few thousandths of an inch deflection in the downward direction. The space in the recess 43a is connected by means of the drilled holes 43b with the passageway 7b whereby the lower surface of the diaphragm 8 is exposed to the fluctuating pressure in the engine space. The upper clamping member comprises the shell 44 screwed into body 7 and electrically grounded thereby, and within the shell 44 the insulated electrode 9, which two are separated by an annular gap. The surfaces of the shell 44 and insulated electrode 9 adjacent to the diaphragm 8 are lapped flat so as to provide a support for the diaphragm 8 and limit its upward motion. It will be noted that in virtue of this construction the peripheral edge of diaphragm 8 is clamped with an even pressure all around because the lower clamping member 43 can accommodate itself on the conical bottom of the body so as to present to the diaphragm a surface parallel with the clamping area of the upper clamping member 44. Furthermore, during the clamping operation, when the upper clamping member is screwed into the body 7, no twisting, turning or rubbing action will be exerted on the diaphragm 8 because the three parts: upper clamping member 44, diaphragm 8, and lower clamping member 43 will turn together with reference to the body 7. It will be also noted that the diaphragm will be deflected from its unstressed, plane form always in one direction, that is, downwards, whereby stress reversal is minimized. Finally, the heat flow will take the path mainly from the spigot 7a of the body towards the fins from where it is dissipated into the atmosphere. Only a comparatively small portion of the heat will pass through the diaphragm, from which it is effectively transmitted to the upper clamping member 44, to be dissipated through fins 45.

For insulated electrode I followed the general construction of an aero engine spark plug fitted with cooling fins, and having mica insulation. The balancing pressure medium is admitted through the insulated pipe 10 and insulated pipe connection 10a to the longitudinally drilled insulated terminal 9 from which it passes onto the upper surface of the diaphragm 8 through passages 9a drilled in the insulated terminal 9 and passages 44a drilled in the bottom portion of the outer shell 44.

While I have described the preferred construction of my invention in detail I do not restrict my invention to the described examples but extend it to all combinations and modifications covered by the appended claims.

I claim:

1. An instrument for examining the operation of a reciprocating engine by measuring the duration and phase of a periodic event of the engine cycle; comprising a contactor responsive to said periodic event and means for operating said contactor for making an electric contact at the beginning of said periodic event and for breaking said electric contact at the end of said periodic event, an electric circuit controlled by said contactor, a signal lamp connected in said electric circuit and controlled by said contactor, a rotor connected to rotate in synchronism with the engine, a light-conducting arm carried by said rotor and extending from near the center of rotation of said rotor to the periphery of said rotor, a stationary housing for said rotor having means for holding said signal lamp stationary near the center of rotation of said rotor to illuminate the central end of said light-conducting arm, a scale carried by said stationary housing for reading the length and the phase of beginning and phase of end of the illuminated arc described by the peripheral end of said light-conducting arm.

2. An instrument for examining the operation of a reciprocating engine by measuring the periodically fluctuating pressure therein by the pressure-balancing method; comprising a source of balancing pressure and means for altering and measuring the magnitude of said balancing pressure, a pressure-responsive contactor acted upon by both the said fluctuating pressure and said balancing pressure and means for operating said contactor for making and breaking an electric contact in response to the difference between said fluctuating pressure and said balancing pressure, an electric circuit controlled by said contactor, a signal lamp connected in said electric circuit and controlled by said contactor, a rotor connected to rotate in synchronism with the engine, a light-conducting arm carried by said rotor and extending from near the center of rotation of said rotor to the periphery of said rotor, a stationary housing for said rotor having means for holding said signal lamp stationary near the center of rotation of said rotor to illuminate the central end of said light-conducting arm, a scale carried by said stationary housing for reading the length and the phase of beginning and phase of end of the illuminated arc described by the peripheral end of said light-conducting arm.

3. An instrument for examining the operation of a reciprocating engine by measuring the duration and phase of several different periodic events of the engine cycle and their phase-relation to each other; comprising several contactors each responsive to one of said different periodic events and each having means for making an electric contact at the beginning of said one periodic event and for breaking of said electric contact at the end of said one periodic event, an electric circuit controlled by said contactors, a signal lamp connected in said electric circuit and controlled by said contactors, a rotor connected to rotate in synchronism with the engine, a light-conducting arm carried by said rotor and extending from near the center of rotation of said rotor to the periphery of said rotor, a stationary housing for said rotor having means for holding said signal lamp stationary near the center of rotation of said rotor to illuminate the central end of said light-conducting arm, a scale carried by said stationary housing for reading the length and the phase of beginning and phase of end of the illuminated arcs described by the peripheral end of said light-conducting arm.

4. An instrument for examining the operation of a multi-cylinder reciprocating engine by measuring the duration and phase of a periodic event of the engine cycle in several cylinders with respect to their phase relation; comprising several contactors each serving one cylinder of said engine and responsive to said periodic event and each having means for making an electric contact at the beginning of said periodic event and for breaking of said electric contact at the end of said periodic event when said periodic event occurs in the engine cylinder served by said contactor, an electric circuit controlled by said contactors, a signal lamp connected in said electric circuit and controlled by said contactors, a rotor connected to rotate in synchronism with the engine, a severality of light-conducting arms carried by said rotor, each of said light conducting arms serving one cylinder of said engine and each of said light conducting arms extending from near the center of rotation of said rotor to the periphery of said rotor and the peripheral ends of said light-conducting arms rotating in different planes perpendicular to the axis of rotation of said rotor and the peripheral ends of said light conducting arms being disposed in similar angular relation to each other as are the dead center phases of the pistons of the several engine cylinders that each light-conducting arm serves, a stationary housing for said rotor having means for holding said signal lamp stationary near the center of rotation of said rotor to illuminate the central ends of said light-conducting arms, a scale carried by said stationary housing for reading the length and the phase of beginning and phase of end of the illuminated arcs described by the peripheral ends of said light-conducting arms.

5. In an instrument for examining the operation of a reciprocating engine by measuring the periodically fluctuating pressure in some space of the engine by the pressure balancing method: a pressure-responsive contactor acted upon by both the said fluctuating pressure and the balancing pressure, comprising a body forming a chamber having a conically recessed bottom and a passageway serving to connect said conically recessed bottom with the engine space to be investigated, two clamping members contained within said chamber, a metal diaphragm clamped between said two clamping members, one of said clamping members being of approximately hemispherical shape and seated with its spherical surface on said conically recessed bottom of said chamber and having its flat surface adjacent to said diaphragm formed with an annular plane clamping area and within the latter with a shallow recess and having bores connecting said shallow recess with said passageway of said body for conducting said fluctuating engine pressure to the adjacent side of said diaphragm, the other of said clamping members having adjacent to said diaphragm a flat surface consisting of a peripheral annular grounded portion and a central insulated portion separated by an annular gap and being provided with passages, means for conducting the balancing pressure medium to the passages of said clamping member and hence to the adjacent side of said diaphragm.

KALMAN JOHN DE JUHASZ.